US009734571B2

United States Patent
Hotta (10) Patent No.: US 9,734,571 B2
(45) Date of Patent: Aug. 15, 2017

(54) IMAGE PROCESSING METHOD, IMAGE PROCESSING SYSTEM, AND STORAGE MEDIUM STORING IMAGE PROCESSING PROGRAM

(71) Applicant: HAMAMATSU PHOTONICS K.K., Hamamatsu-shi, Shizuoka (JP)

(72) Inventor: Kazuhiro Hotta, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 0 days.

(21) Appl. No.: 14/582,520

(22) Filed: Dec. 24, 2014

(65) Prior Publication Data

US 2015/0187059 A1 Jul. 2, 2015

Related U.S. Application Data

(60) Provisional application No. 61/920,820, filed on Dec. 26, 2013.

(51) Int. Cl.
*G06T 7/00* (2017.01)
*G06K 9/48* (2006.01)
(Continued)

(52) U.S. Cl.
CPC .............. *G06T 7/001* (2013.01); *G06K 9/48* (2013.01); *G06K 9/52* (2013.01); *G06K 9/6201* (2013.01);
(Continued)

(58) Field of Classification Search
CPC . G06T 7/001; G06K 9/48; G06K 9/52; G06K 9/6201
(Continued)

(56) References Cited

U.S. PATENT DOCUMENTS

2003/0152276 A1* 8/2003 Kondo .................... G06T 7/001
382/224
2007/0011519 A1* 1/2007 Takeda ................. G01N 21/956
714/724
(Continued)

FOREIGN PATENT DOCUMENTS

JP H7-311168 11/1995
JP 11016974 A * 1/1999
(Continued)

OTHER PUBLICATIONS

U.S. Office Action dated Feb. 2, 2016 that issued in U.S. Appl. No. 14/582,507 including Double Patenting Rejections on pp. 2-4.
(Continued)

*Primary Examiner* — Amandeep Saini
(74) *Attorney, Agent, or Firm* — Drinker Biddle & Reath LLP (57) ABSTRACT

An image processing method includes a step of acquiring a measured image $G_{1B}$ measured from a semiconductor device S and a first pattern image $G_{2B}$ showing a pattern of the semiconductor device S, a step of acquiring a reference measured image $G_{3B}$ measured from a reference semiconductor device SR being the semiconductor device S or a semiconductor device different from the semiconductor device S and a second pattern image $G_{4B}$ showing a pattern of the reference semiconductor device SR, a step of acquiring matching information indicating a correlation of the first pattern image $G_{2B}$ and the second pattern image $G_{4B}$, and a step of determining a difference of the measured image $G_{1B}$ and the reference measured image $G_{3B}$ based on the matching information to acquire a comparative image $G_{5B}$.

26 Claims, 7 Drawing Sheets

(51) Int. Cl.
*G06K 9/62* (2006.01)
*G06K 9/52* (2006.01)

(52) U.S. Cl.
CPC ............... *G06T 2207/10048* (2013.01); *G06T 2207/30148* (2013.01)

(58) Field of Classification Search
USPC ........................................................ 382/145
See application file for complete search history.

(56) References Cited

U.S. PATENT DOCUMENTS

2007/0019858 A1* 1/2007 Shimura ................ G06T 7/001
  382/149
2011/0268363 A1* 11/2011 Osaki .................. G03F 7/70633
  382/209

FOREIGN PATENT DOCUMENTS

| | | |
|---|---|---|
| JP | H11-016974 | 1/1999 |
| JP | 2005-310805 A | 11/2005 |
| WO | WO 2006/137415 | 12/2006 |

OTHER PUBLICATIONS

Final Office Action issued Jun. 13, 2016 in U.S. Appl. No. 14/582,507 including Double Patenting Rejections on pp. 5-7.
International Preliminary Report on Patentability issued Jul. 7, 2016 in International Application No. PCT/JP2014/0080093.
International Preliminary Report on Patentability issued Jul. 7, 2016 in International Application No. PCT/JP2014/0080096.

* cited by examiner

IMAGE PROCESSING METHOD, IMAGE PROCESSING SYSTEM, AND STORAGE MEDIUM STORING IMAGE PROCESSING PROGRAM

CROSS-REFERENCE TO RELATED APPLICATION

This application claims priority to Provisional Application Ser. No. 61/920,820 filed on Dec. 26, 2013, which is hereby incorporated by reference in its entirety.

BACKGROUND OF THE INVENTION

Field of the Invention

The present invention relates to an image processing method, an image processing system, and a storage medium storing an image processing program.

Related Background Art

Conventionally, an image of a device under test (DUT) such as a semiconductor device has been acquired, and various types of analysis such as an analysis of a failure point have been performed based on the image. For example, the following patent document 1 discloses a measurement device including a scanning electron microscope for measuring the line width of a circuit pattern formed on a semiconductor wafer. In this device, position detection in an observation image is performed using a template.

CITATION LIST

Patent Literature

Patent Document 1: Japanese Patent Application Laid-Open No. 2005-310805

SUMMARY OF THE INVENTION

Technical Problem

Here, there has been an increased demand, when comparing measured images of a plurality of devices under test such as a non-defective device under test and a defective device under test with each other, for generating a comparative image for which signal images including separately acquired measured images are compared with each other. In that case, the accuracy of alignment between the plurality of signal images is important. In this case, with the method mentioned above, the accuracy of alignment is poor, which causes difficulty when acquiring a signal image and a pattern image.

Therefore, it is an object of the present invention to provide an image processing method, image processing apparatus, and image processing program capable of accurately generating a comparative image of a plurality of measured images of a semiconductor device(s).

Solution to Problem

In order to solve the above-described problems, an image processing method according to an aspect of the present invention is a method for acquiring a comparative image of a measured image measured from a semiconductor device and a reference measured image measured from a reference semiconductor device, and includes acquiring the measured image measured from the semiconductor device and a first pattern image showing a pattern of the semiconductor device corresponding to the measured image, acquiring the reference measured image measured from the reference semiconductor device being the semiconductor device or a semiconductor device different from the semiconductor device and a second pattern image showing a pattern of the reference semiconductor device corresponding to the reference measured image, acquiring matching information indicating a correlation of the first pattern image and the second pattern image based on the first pattern image and the second pattern image, and determining a difference of the measured image and the reference measured image based on the matching information to acquire the comparative image.

Alternatively, an image processing system according to another aspect of the present invention is a system for acquiring a comparative image of a measured image measured from a semiconductor device and a reference measured image measured from a reference semiconductor device, and includes a storage configured to store the measured image measured from the semiconductor device, a first pattern image showing a pattern of the semiconductor device corresponding to the measured image, the reference measured image measured from the reference semiconductor device being the semiconductor device or a semiconductor device different from the semiconductor device, and a second pattern image showing a pattern of the reference semiconductor device corresponding to the reference measured image, an image analyzer configured to acquire matching information indicating a correlation of the first pattern image and the second pattern image based on the first pattern image and the second pattern image, and an image processor configured to determine a difference of the measured image and the reference measured image based on the matching information to acquire a comparative image.

Alternatively, a storage medium according to another aspect of the present invention is a storage medium storing an image processing program for acquiring a comparative image of a measured image measured from a semiconductor device and a reference measured image measured from a reference semiconductor device, the image processing program causing a computer to function as an image analyzer configured to, based on a first pattern image showing a pattern of the semiconductor device, corresponding to the measured image measured from the semiconductor device and a second pattern image showing a pattern of the reference semiconductor device being the semiconductor device or a semiconductor device different from the semiconductor device, corresponding to the reference measured image measured from the reference semiconductor device, acquire matching information indicating a correlation of the first pattern image and the second pattern image, and an image processor configured to determine a difference of the measured image and the reference measured image based on the matching information to acquire a comparative image.

According to such an image processing method, image processing apparatus, or a storage medium storing the image processing program, the positional relationship of the measured image and the reference measured image can be accurately obtained based on the matching information between the first pattern image corresponding to the measured image of the semiconductor device and the second pattern image corresponding to the reference measured image of the reference semiconductor device, and by acquiring a comparative image between the measured image and the reference measured image based on that positional relationship, an accurate comparative image can be obtained.

An image processing method according to still another aspect of the present invention is a method for acquiring a comparative image of a measured image measured from a semiconductor device and a reference measured image measured from a reference semiconductor device, and includes acquiring the measured image measured from the semiconductor device, acquiring the reference measured image measured from the reference semiconductor device being the semiconductor device or a semiconductor device different from the semiconductor device, extracting first shape information from the measured image, extracting second shape information from the reference measured image, acquiring matching information indicating a correlation of the measured image and the reference measured image based on the first shape information and the second shape information, and determining a difference of the measured image and the reference measured image based on the matching information to acquire the comparative image.

Alternatively, an image processing system according to still another aspect of the present invention is a system for acquiring a comparative image of a measured image measured from a semiconductor device and a reference measured image measured from a reference semiconductor device, and includes a storage configured to store the measured image measured from the semiconductor device and the reference measured image measured from the reference semiconductor device being the semiconductor device or a semiconductor device different from the semiconductor device, an image analyzer configured to extract first shape information from the measured image, extract second shape information from the reference measured image, and acquire matching information indicating a correlation of the measured image and the reference measured image based on the first shape information and the second shape information, and an image processor configured to determine a difference of the measured image and the reference measured image based on the matching information to acquire the comparative image.

Alternatively, a storage medium according to another aspect of the present invention is a storage medium storing an image processing program for acquiring a comparative image of a measured image measured from a semiconductor device and a reference measured image measured from a reference semiconductor device, the image processing program causing a computer to function as an image analyzer configured to extract first shape information from the measured image measured from the semiconductor device, extract second shape information from the reference measured image measured from the reference semiconductor device being the semiconductor device or a semiconductor device different from the semiconductor device, and acquire matching information indicating a correlation of the measured image and the reference measured image based on the first shape information and the second shape information, and an image processor configured to determine a difference of the measured image and the reference measured image based on the matching information to acquire a comparative image.

According to such an image processing method, image processing system, or a storage medium storing the image processing program, the positional relationship of the measured image and the reference measured image can be accurately obtained based on the matching information between the measured image of the semiconductor device and the reference measured image of the reference semiconductor device, and by acquiring a comparative image between the measured image and the reference measured image based on that positional relationship, an accurate comparative image can be obtained. Further, matching information can thus be easily obtained even when the measured image and the reference measured image are different in contrast.

Advantageous Effects of Invention

The present invention enables accurately generating a comparative image of a plurality of measured images of a semiconductor device(s).

DESCRIPTION OF THE PREFERRED EMBODIMENTS

Hereinafter, preferred embodiments of an image processing method, image processing apparatus, and image processing program according to the present invention will be described together with the drawings. Also, the same components are denoted with the same reference numerals in description of the drawings, and overlapping description will be omitted.

First Embodiment

Figure 1:
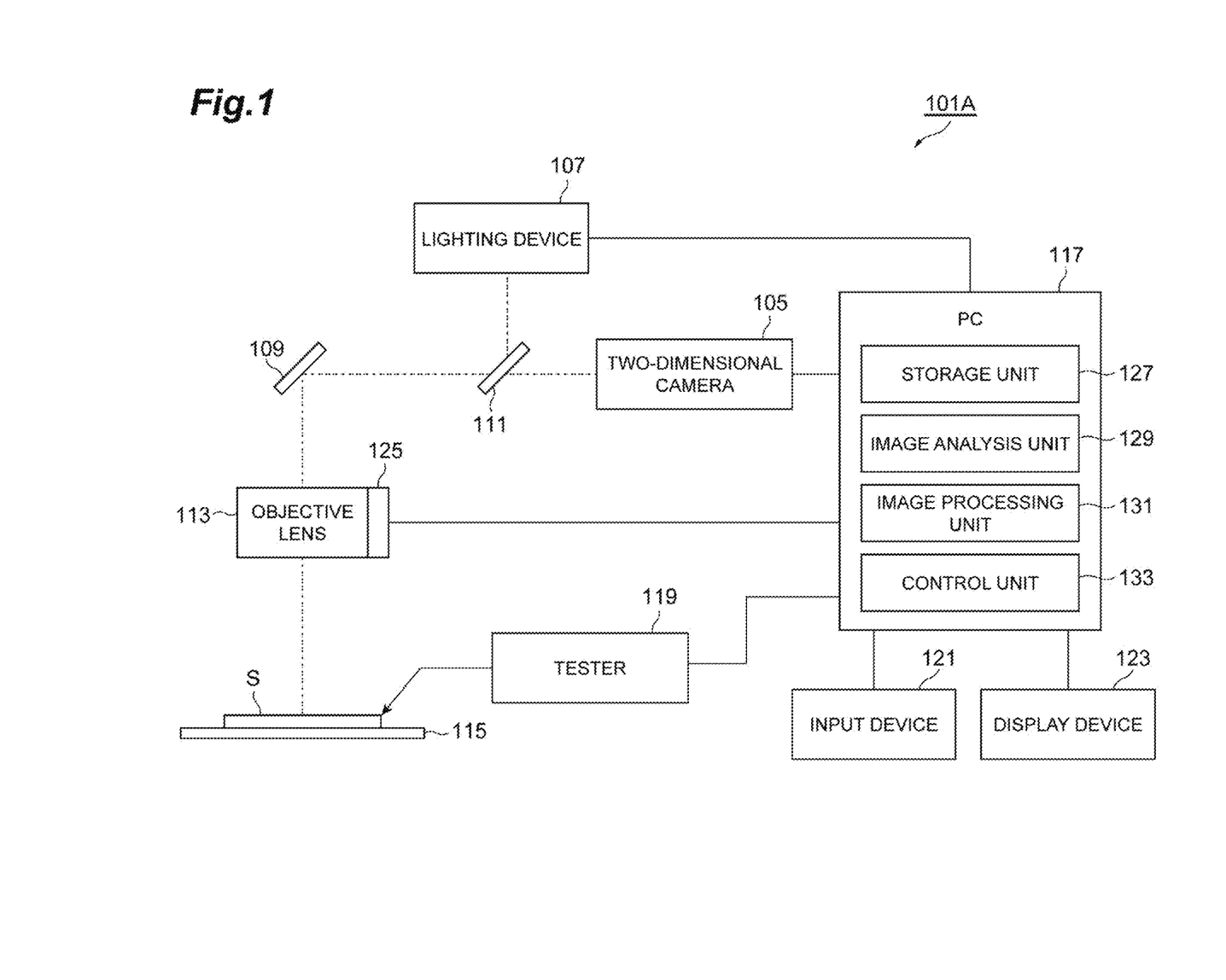
FIG. 1 is a schematic configuration diagram of an observation system 101A according to a first embodiment of the present invention.

FIG. 1 is a schematic configuration diagram of an observation system 101A which is an image processing apparatus according to a first embodiment of the present invention. The observation system 101A shown in FIG. 1 is an optical system that acquires and processes an image to observe a photo emission of an IC (Integrated Circuit) such as a semiconductor memory or an LSI or a semiconductor device such as a power device. The observation system 101A is configured including a two-dimensional camera 105, a lighting device 107, a mirror 109, a beam splitter 111 such as a half-mirror, an objective lens 113, a stage 115, a computer 117 such as a PC (Personal Computer), a tester 119, an input device 121, and a display device 123.

The two-dimensional camera 105 is a camera having a built-in CCD image sensor or CMOS image sensor having sensitivity at near-infrared wavelengths, an InGaAs camera, or an MCT (Mercury Cadmium Tellu) camera, and captures a two-dimensional image such as a reflection image and photo emission image of a semiconductor device S placed on the stage 115. The two-dimensional camera 105 detects a two-dimensional image of the semiconductor device S via the objective lens 113, the mirror 109, and the beam splitter 111.

The objective lens 113 is provided opposite to the semiconductor device S, and sets the magnification of an image to be formed on the two-dimensional camera 105. The objective lens 113 includes an objective lens switching means 125 and a plurality of lenses of different powers, and has a function of switching the objective lens 113 to form an image on the two-dimensional camera 105 between a high-power lens and a low-power lens.

The mirror 109 reflects a reflection image and photo emission image of the semiconductor device S toward the two-dimensional camera 105. The beam splitter 111 transmits the reflected image and photo emission image reflected by the mirror 109 toward the two-dimensional camera 105, and reflects illumination light for pattern image generation emitted from the lighting device 107 toward the mirror 109 to thereby irradiate the semiconductor device S with the illumination light by way of the mirror 109 and the objective lens 113.

The tester 119 applies a test pattern of a predetermined electric signal, a predetermined voltage, or a predetermined current to the semiconductor device S. By the application of a test pattern, a photo emission image due to a failure of the semiconductor device S is produced.

The computer 117 is an image processing device that processes an image acquired by the two-dimensional camera 105. In greater detail, the computer 117 consists of, as functional components, a storage unit 127, an image analysis unit (image analyzer) 129, and an image processing unit (image processor) 131, and a control unit (controller) 133. Also, the computer 117 is attached with an input device 121 such as a mouse and/or keyboard to input data to the computer 117, and a display device 123 such as a display unit to display a result of image processing by the computer 117.

The respective functional units of the computer 117 shown in FIG. 1 are of functions that are realized by an arithmetic processing unit such as a CPU of the computer 117 executing a computer program (image processing program) stored in a storage medium such as a built-in memory or hard disk drive of the computer 117. The arithmetic processing unit of the computer 117 causes the computer 117 to function as the respective functional units of FIG. 1 by executing the image processing program to sequentially execute processings corresponding to an image processing method to be described later. Various types of data necessary for execution of the computer program and various types of data generated by execution of the computer program are all stored in a storage medium such as a built-in memory including a ROM, RAM, etc., and/or hard disk drive of the computer 117.

Here, the functions of the respective functional units of the computer 117 will be described. The storage unit 127 sequentially stores a measured image with a photo emission image of a semiconductor device S detected acquired by the two-dimensional camera 105, a first pattern image with a pattern image of the semiconductor device S detected acquired by the two-dimensional camera 105, a reference measured image with a photo emission image of a reference semiconductor device SR detected acquired by the two-dimensional camera 105, and a second pattern image with a pattern image of the reference semiconductor device SR detected acquired by the two-dimensional camera 105. The image analysis unit 129 and the image processing unit 131 execute various types of image data processing for the images stored in the storage unit 127. In detail, the image analysis unit 129 acquires matching information indicating a correlation in terms of the position, size, and angle of the first pattern image and the second pattern image stored in the storage unit 127. Also, the image processing unit 131 refers to the matching information acquired by the image analysis unit 129, while acquiring a comparative image by determining a difference of the measured image and the reference measured image. The control unit 133 controls data processing in the computer 117 and processing of the devices connected to the computer 117. For example, the control unit 133 controls emission of illumination light by the lighting device 107, imaging by the two-dimensional camera 105, switching of the power of the objective lens 113, application of a test pattern by the tester 119, and display of an observation result (a comparative image etc.) by the display device 123.

In the following, description will be given of a procedure for generating a comparative image by the observation system 101A, while an image processing method according to the present embodiment will be described in detail.

Figure 2:
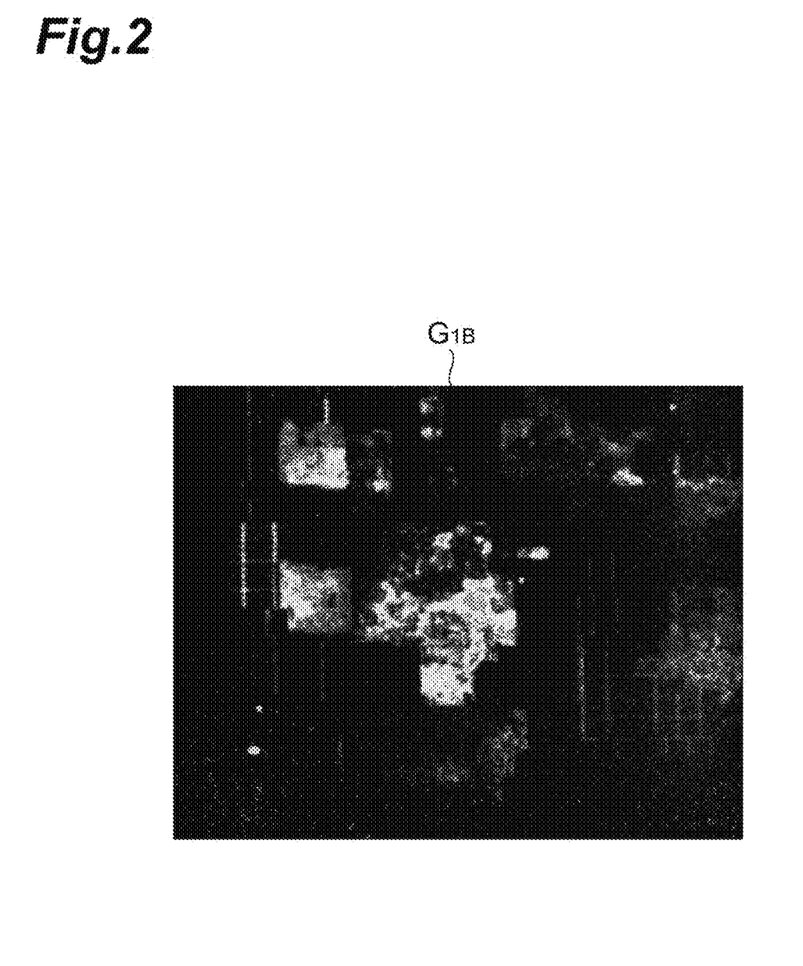
FIG. 2 is a view showing an example of an image of a measured image stored in the storage unit 127 of FIG. 1.

First, after a semiconductor device S for measurement is placed on the stage 115, an instruction to start an observation processing of a semiconductor device is received, using the input device 121, from an operator of the observation system 101A by the computer 117. Then, through control by the control unit 133, the objective lens 113 is set to a preset power, the sensitivity of the two-dimensional camera 105 is switched to a high gain, and application of a test pattern by the tester 119 is started. In this state, through control by the control unit 133, a measured image including a photo emission image of the semiconductor device S is acquired by the two-dimensional camera 105 and stored in the storage unit 127 (step B1-1: photo emission image acquisition step). The measured image is generated by addition of image data of a plurality of images successively captured in a predetermined exposure time. FIG. 2 shows an example of the image of a measured image stored in the storage unit 127. In the measured image $G_{1B}$, a photo emission image that is produced from a point under observation such as a failure point of the semiconductor device S with application of a test pattern is included.

Figure 3:
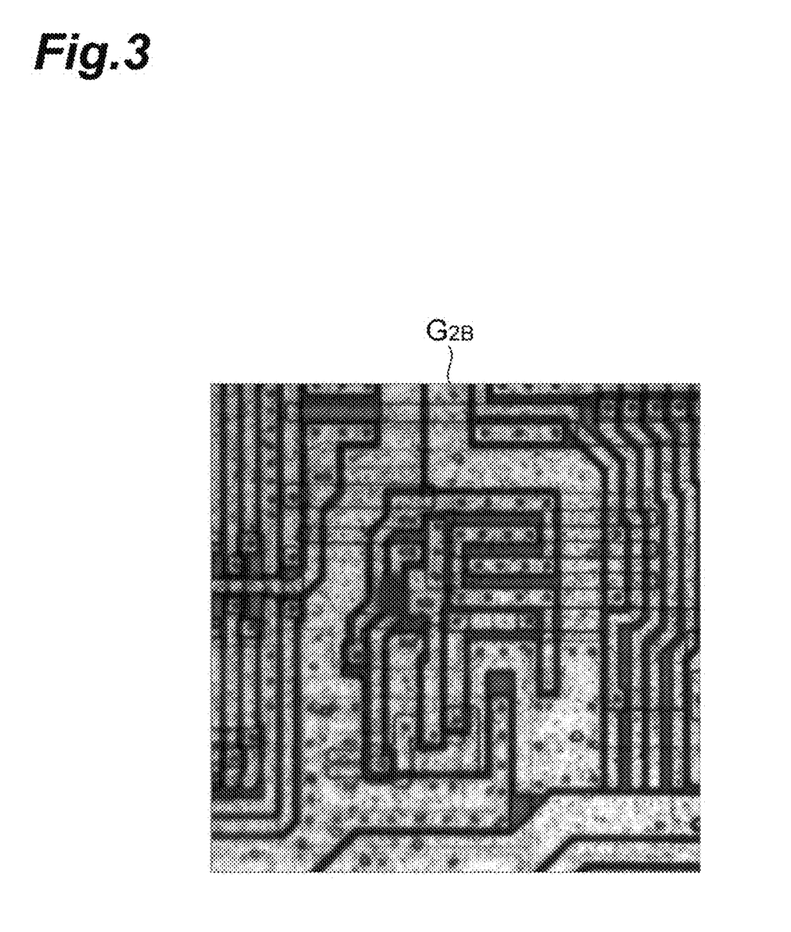
FIG. 3 is a view showing an example of an image of a first pattern image stored in the storage unit 127 of FIG. 1.

Next, through control by the control unit 133, the application of a test pattern by the tester 119 is stopped, emission of illumination light by the lighting device 107 is started, and the sensitivity of the two-dimensional camera 105 is switched to a low gain while the power of the objective lens 113 is kept maintained. In this state, through control by the control unit 133, a first pattern image including a reflection image of the semiconductor device S is acquired by the two-dimensional camera 105 and stored in the storage unit 127 (step B1-2: pattern image acquisition step). FIG. 3 shows an example of the image of a first pattern image stored in the storage unit 127. In the first pattern image $G_{2B}$, a pattern image resulting from a reflection image from the semiconductor device S being captured is included, and the pattern image results in an image representing a pattern of the semiconductor device S. That is, the first pattern image $G_{2B}$ represents a pattern image that is positionally coincident with (corresponds to) a photo emission image included in the measured image $G_{1B}$.

Figure 4:
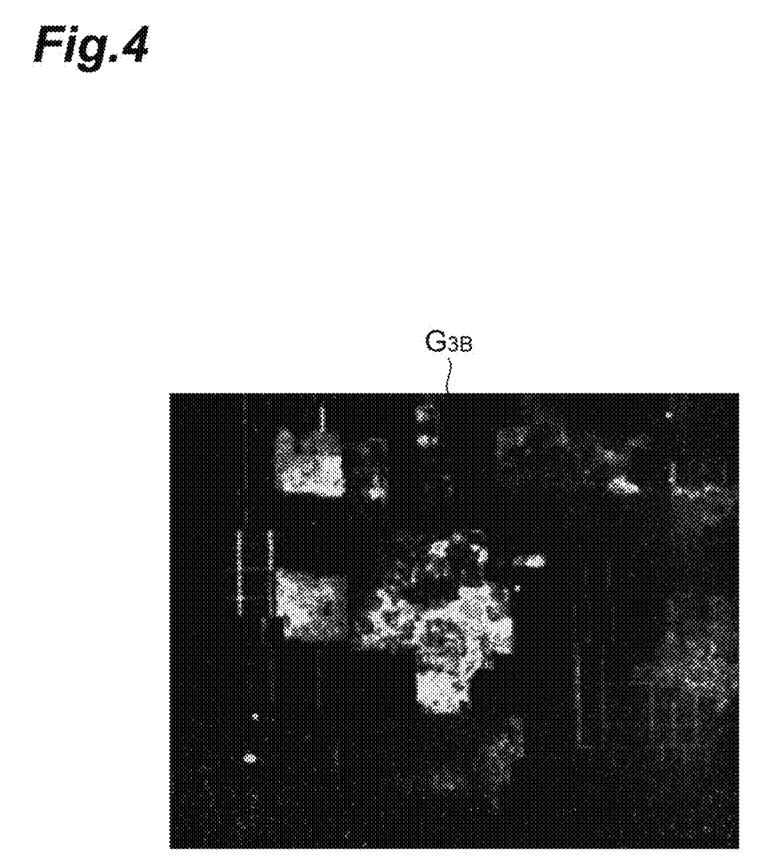
FIG. 4 is a view showing an example of an image of a reference measured image stored in the storage unit 127 of FIG. 1.

Then, through control by the control unit 133, application of a test pattern by the tester 119 is started, the objective lens 113 is set to a preset power, and the sensitivity of the two-dimensional camera 105 is switched to a high gain in a state where a reference semiconductor device SR that is the same as or different from the semiconductor device S has been placed on the stage 115. In this state, through control by the control unit 133, a reference measured image including a photo emission image of the reference semiconductor device SR is acquired by the two-dimensional camera 105 and stored in the storage unit 127 (step B2-1: photo emission image acquisition step). The reference measured image is generated by addition of image data of a plurality of images successively captured in a predetermined exposure time. FIG. 4 shows an example of the image of a reference measured image stored in the storage unit 127. In the reference measured image $G_{3B}$, a photo emission image that is produced from the reference semiconductor device SR with application of a test pattern is included.

Figure 5:
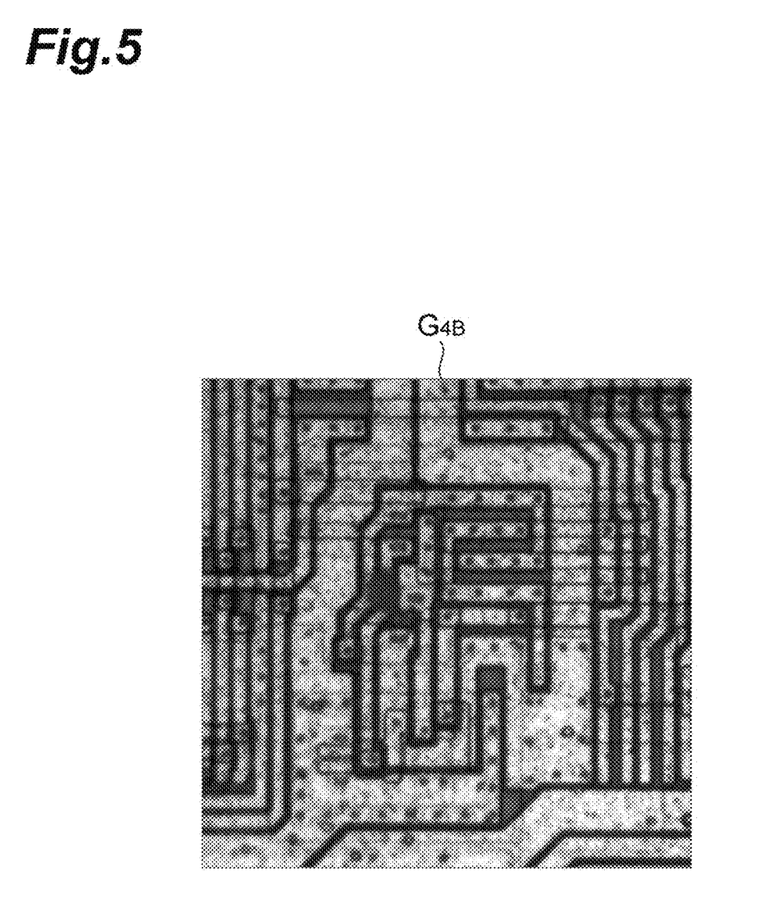
FIG. 5 is a view showing an example of an image of a second pattern image stored in the storage unit 127 of FIG. 1.

Next, through control by the control unit 133, the application of a test pattern by the tester 119 is stopped, emission of illumination light by the lighting device 107 is started, and the sensitivity of the two-dimensional camera 105 is switched to a low gain with the power of the objective lens 113 kept maintained. In this state, through control by the control unit 133, a second pattern image including a reflection image of the reference semiconductor device SR is acquired by the two-dimensional camera 105 and stored in the storage unit 127 (step B2-2: pattern image acquisition step). FIG. 5 shows an example of the image of a second pattern image stored in the storage unit 127. In the second pattern image $G_{4B}$, a pattern image resulting from a reflection image from the reference semiconductor device SR being captured is included, and the pattern image results in an image representing a pattern of the reference semiconductor device SR. That is, the second pattern image $G_{4B}$ represents a pattern image that is positionally coincident with (corresponds to) a photo emission image included in the reference measured image $G_{3B}$.

Then, matching information is acquired by the image analysis unit 129 based on the first pattern image $G_{2B}$ and the second pattern image $G_{4B}$ stored in the storage unit 127 (step B3: matching information acquisition step).

In this step B3, first, the image size of at least either one of the first pattern image $G_{2B}$ or the second pattern image $G_{4B}$ is adjusted based on a ratio of a size of visual field being the size of a range on the semiconductor device S of the first pattern image $G_{2B}$ to a size of visual field being the size of a range on the reference semiconductor device SR of the second pattern image $G_{4B}$ (step B3-1: pattern image adjustment step). More specifically, the image analysis unit 129 acquires the power of the objective lens 113 when the first pattern image $G_{2B}$ was acquired and the power of the objective lens 113 when the second pattern image $G_{4B}$ was acquired, and provides their respective reciprocals as numerical values indicating the sizes of visual fields of the first pattern image $G_{2B}$ and the second pattern image $G_{4B}$. Moreover, the image analysis unit 129 adjusts the size of the second pattern image $G_{4B}$ so as to match an image size on the first pattern image $G_{2B}$ based on the numerical values. For example, where the power when the first pattern image $G_{2B}$ was acquired is 15× and the power when the second pattern image $G_{4B}$ was acquired is 100×, their respective sizes of visual fields are provided as 1/15 and 1/100, and the image size of the second pattern image $G_{4B}$ is adjusted to be 15/100 times. Here, when adjusting the first pattern image $G_{2B}$ and the second pattern image $G_{4B}$ in image size, the image analysis unit 129 may adjust the image size of the first pattern image $G_{2B}$ or may adjust both to different image sizes of an identical magnification.

Figure 6:
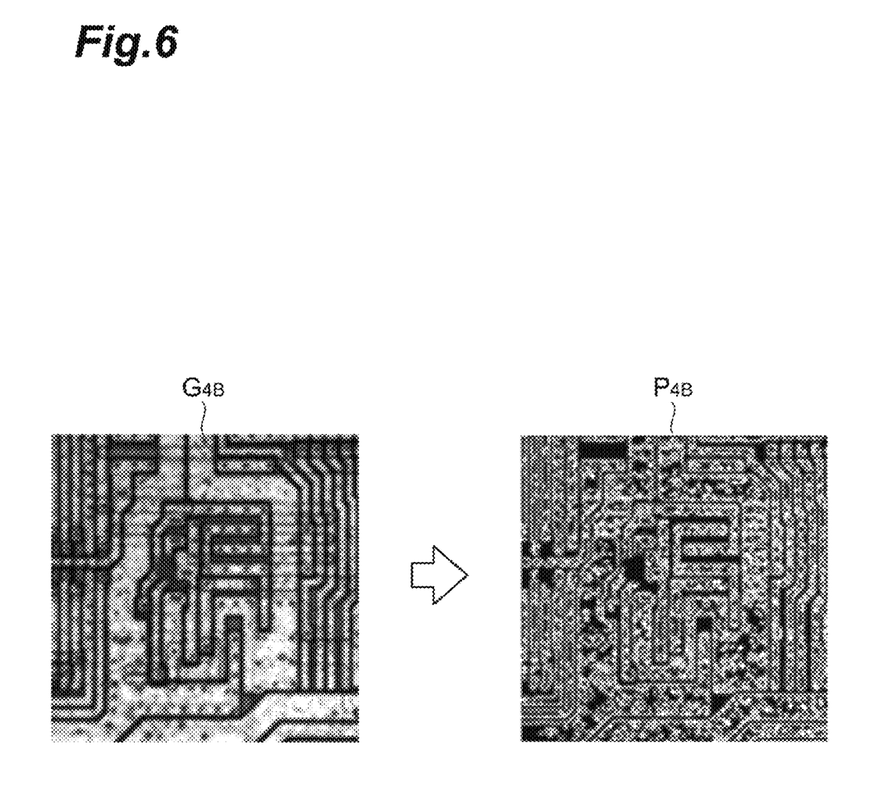
FIG. 6 is a view showing an example of second shape information extracted from the second pattern image by the image analysis unit 129 of FIG. 1.

Next, the image analysis unit 129 performs shape-based matching for the first pattern image $G_{2B}$ and the second pattern image $G_{4B}$ that has been adjusted in image size (step B3-2: shape-based matching step). By performing a matching processing by the shape-based matching, matching can be accurately performed even for the pattern images $G_{2B}$ and $G_{4B}$ different in contrast. In detail, the image analysis unit 129 extracts, from the first pattern image $G_{2B}$ and the second pattern image $G_{4B}$, their respective contours (edge lines) as first and second shape information. Moreover, the image analysis unit 129 searches the first shape information and the second shape information for similar patterns that are similar to each other therebetween. FIG. 6 shows an example of the second shape information extracted from the second pattern image $G_{4B}$ by the image analysis unit 129. As shown therein, the contours of the pattern image included in the second pattern image $G_{4B}$ are extracted as second shape information $P_{4B}$. Here, when performing shape-based matching, the image analysis unit 129 performs matching by pyramid levels by changing the resolution of both or one of the first pattern image $G_{2B}$ and the second pattern image $G_{4B}$ at multiple levels. That is, when acquiring low-resolution images of both or one of the first pattern image $G_{2B}$ and the second pattern image $G_{4B}$ at a plurality of resolutions and matching the first pattern image $G_{2B}$ and the second pattern image $G_{4B}$, a shape matching processing with the other image is proceeded in sequence from high-level images of low resolution to low-level images of high resolution. A high-speed matching processing is thereby realized. In addition, the image analysis unit 129 may set the number of pyramid levels according to the contrast of the first pattern image $G_{2B}$ and the second pattern image $G_{4B}$ and the resolution of the original image.

Then, the image analysis unit 129 acquires matching information indicating a correlation of the first pattern image $G_{2B}$ and the second pattern image $G_{4B}$ from a result of the shape-based matching (step B3-3: information acquisition step). Such matching information includes positional information indicating the position of the first pattern image $G_{2B}$ with respect to the second pattern image $G_{4B}$, angle information indicating the rotation angle on an image plane of the first pattern image $G_{2B}$ with respect to the second pattern image $G_{4B}$, and the magnification of the first pattern image $G_{2B}$ with respect to the second pattern image $G_{4B}$.

Figure 7:
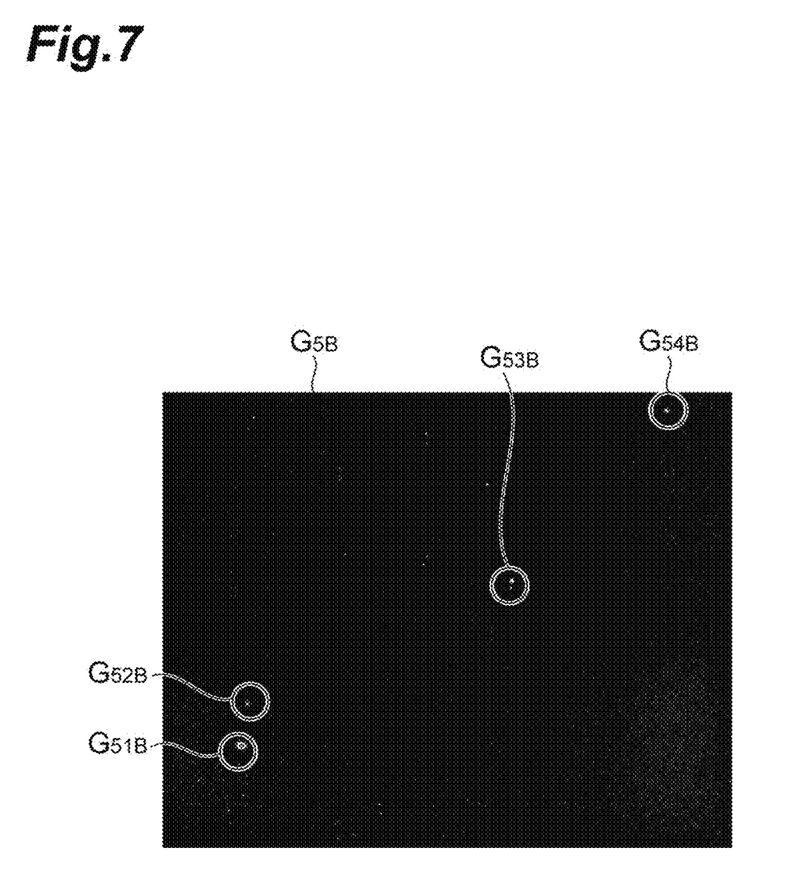
FIG. 7 is a view showing an example of a comparative image generated based on the measured image and reference measured image by the image processing unit 131 of FIG. 1.

After the processing of step B3, a comparative image is acquired as a result of a subtraction processing being applied to the measured image $G_{1B}$ and the reference measured image $G_{3B}$, by the image processing unit 131, based on the matching information acquired by the image analysis unit 129, and the comparative image is displayed on the display device 123 (step B4: comparative image acquisition step). In detail, the image processing unit 131, based on the matching information, adjusts the image size, image position, and image angle of at least one of the measured image $G_{1B}$ and the reference measured image $G_{3B}$ so as to match those of the other. Then, by the image processing unit 131, the difference values by pixel between the measured image $G_{1B}$ and the reference measured image $G_{3B}$ after adjustment are made into an image to generate a comparative image. At this time, the comparative image may be generated as one for which absolute values of the difference values are expressed by shading or luminance, or may be generated as one that represents the difference values as a color image of relative values. Alternatively, the comparative image may be one determined by subtracting the reference measured image $G_{3B}$ from the measured image $G_{1B}$ or may be one determined by subtracting the measured image $G_{1B}$ from the reference measured image $G_{3B}$. FIG. 7 shows an example of the comparative image $G_{5B}$ generated based on the measured image $G_{1B}$ and the reference measured image $G_{3B}$ by the image processing unit 131. As shown therein, differences in photo emission images between the reference measured image $G_{3B}$ and the measured image $G_{1B}$ appear in the comparative image $G_{5B}$ as a plurality of comparative images $G_{51B}$ to $G_{54B}$.

According to the observation system 101A and the image processing method using the same described above, the positional relationship of the measured image $G_{1B}$ and the reference measured image $G_{3B}$ can be accurately obtained based on the matching information between the first pattern image $G_{2B}$ corresponding to the measured image $G_{1B}$ of the semiconductor device S and the second pattern image $G_{4B}$ corresponding to the reference measured image $G_{3B}$ of the reference semiconductor device SR, and by acquiring a comparative image $G_{5B}$ between the measured image $G_{1B}$ and the reference measured image $G_{3B}$ based on that positional relationship, an accurate comparative image can be obtained. As a result, a difference in light emitting reaction to the test pattern between the semiconductor device S and the reference semiconductor device SR can be easily identified.

Also, shape information is extracted respectively from the first and second pattern images $G_{2B}$ and $G_{4B}$ and matching information is acquired based on the shape information. Matching information can thus be easily obtained even when the first and second pattern images $G_{2B}$ and $G_{4B}$ are different in contrast.

Also, the image size of at least either of the first and second pattern images $G_{2B}$ and $G_{4B}$ is adjusted based on the ratio in size of visual field between the first and second pattern images $G_{2B}$ and $G_{4B}$. In this case, even if the measured image $G_{1B}$ and the reference measured image $G_{3B}$ are different in size of visual field, a comparative image $G_{5B}$ in which these images are coincident with one another in position on the semiconductor device S, SR can be prepared.

Further, the positional information, rotational information, and magnification information indicating a correlation of the first and second pattern images $G_{2B}$ and $G_{4B}$ are used as matching information. The positional relationship of the measured image $G_{1B}$ and the reference measured image $G_{3B}$ can thereby be simply obtained, and based thereon, a comparative image $G_{5B}$ can be simply acquired.

First Modification of First Embodiment

Next, description will be given, regarding a first modification of the first embodiment of the present invention, of only the difference from the first embodiment. In addition, the constitution of an observation system according to the present modification is the same as the constitution of the observation system 101A shown in FIG. 1.

A procedure for generating a comparative image in the present embodiment is different from the first embodiment in the following point.

That is, after a measured image $G_{1B}$ is acquired and stored in the storage unit 127 as a result of step B1-1 being executed, the process for acquiring a first pattern image $G_{2B}$ of step B1-2 is omitted. Further, after a reference measured image $G_{3B}$ is acquired and stored in the storage unit 127 as a result of step B2-1 being executed, the process for acquiring a second pattern image $G_{4B}$ of step B2-2 is omitted.

Then, in the processing of step B3, matching information is acquired, by the image analysis unit 129, based on the measured image $G_{1B}$ and the reference measured image $G_{3B}$ stored in the storage unit 127. That is, in step B3-1, the image size of at least either one of the measured image $G_{1B}$ and the reference measured image $G_{3B}$ is adjusted based on a ratio in size of visual field between the measured image $G_{1B}$ and the reference measured image $G_{3B}$. Next, in step B3-2, the image analysis unit 129 performs shape-based matching for the measured image $G_{1B}$ and the reference measured image $G_{3B}$. In detail, the image analysis unit 129 extracts, from the measured image $G_{1B}$ and the reference measured image $G_{3B}$, their respective contours (edge lines) as first and second shape information. At that time, the image analysis unit 129 makes the measured image $G_{1B}$ and the reference measured image $G_{3B}$ into multiple values based on their contrasts (luminance values), and also uses a boundary caused by a difference in luminance value as the first or second shape information. A measured image such as a photo emission image has little shape information as compared with a pattern image, but more shape information can be acquired by recognizing a boundary caused by a difference in luminance value as a shape, and matching accuracy is improved. Moreover, the image analysis unit 129 searches the first shape information and the second shape information for similar patterns that are similar to each other therebetween. Then, in step B3-3, the image analysis unit 129 acquires matching information indicating a correlation of the measured image $G_{1B}$ and the reference measured image $G_{3B}$ from a result of the shape-based matching.

In step B4, a comparative image is acquired as a result of a subtraction processing being applied to the measured image $G_{1B}$ and the reference measured image $G_{3B}$, by the image processing unit 131, based on the matching information acquired by the image analysis unit 129, and the comparative image is displayed on the display device 123.

In addition, the present invention is not limited to the embodiment mentioned above. For example, the reference measured image $G_{3B}$ that is acquired in the first embodiment and the first modification of the first embodiment is not limited to being a photo emission image of a reference semiconductor device SR different from a semiconductor device S, and a photo emission image when a test pattern different from that when a measured image $G_{1B}$ was acquired was applied to the same semiconductor device S may be provided as a reference measured image $G_{3B}$.

Also, the measured image $G_{1B}$ and the reference measured image $G_{3B}$ are not limited to photo emission images or thermal emission images of a semiconductor device(s). For example, the measured image $G_{1B}$ and the reference measured image $G_{3B}$ may be electric signal images having been made into images by two-dimensionally scanning laser light onto the semiconductor device S, SR, while detecting an electric signal generated in the semiconductor device S, SR, and relating the scanning positions on the semiconductor device S, SR of laser light and characteristic values of the electric signal to each other. Examples of such an electric signal image that can be mentioned include an OBIC (Optical Beam Induced Current) image being an photoinduced current image, an OBIRCH (Optical Beam Induced Resistance Change) image being an electrical quantity change image, and an SDL (Soft Defect Localization) image being a pass/fail information image.

The OBIC image is one acquired by detecting an photoinduced current generated by laser light as a characteristic value (current value or value of current change) of an electric signal, and making the characteristic values into an image in coordination with laser irradiating position information. On the other hand, the OBIRCH image is one for which characteristic values (voltage values or values of voltage change) of an electric signal according to changes in resistance value of the position of irradiation with laser light of the semiconductor device are made into an image by scanning laser light with a constant current applied to the semiconductor device. That is, the OBIRCH image is one for which values of voltage change and laser irradiating position information are coordinated with each other into an image. In addition, the OBIRCH image may be one for which values of current change of an electric signal according to changes in resistance value of the position of irradiation with laser light of the semiconductor device are made into an image by scanning laser light with a constant voltage applied to the semiconductor device. Still, on the other hand, the SDL image is also called a DALS (Dynamic Analysis by Laser Stimulation) image or a LADA (Laser Assisted Device Alteration) image, and is one that is acquired, by scanning laser light with a test pattern applied to the semiconductor device to detect a malfunctioning state, as an image of pass/fail information of malfunction information that is multi-valued with respect to the laser irradiating position on a semiconductor device.

Also, the measured image $G_{1B}$ and the reference measured image $G_{3B}$ may be electro-optical frequency mapping images (EOFM (Electro Optical Frequency Mapping) images) generated as in the following. That is, laser light is two-dimensionally scanned onto the semiconductor device S, SR with a test pattern repeatedly applied to the semiconductor device S, SR by the tester 119, while reflected light generated in the semiconductor device S, SR is detected. Moreover, after extracting an AC component of a detection signal, a frequency analysis at a specific frequency is performed for the detection signal using a frequency analysis device such as a spectrum analyzer or a lock-in detector, and analysis data is output to the computer 117. Further, in the computer 117, by relating the scanning positions on the semiconductor device S, SR of laser light and the analysis data to each other, an EOFM image for which the signal intensity of parts operating at the specific frequency is made into an image is acquired. In addition, an amplitude linage, a phase image, an I/Q image, or the like can be the EOFM image. In the case of an amplitude image, the analysis data is the amplitude of a detection signal at a specific frequency, and in the case of a phase image, the analysis data is the phase (a phase difference) of a signal of a specific frequency and a detection signal. On the other hand, in the case of an I/Q (In-phase/Quadrature) image, the analysis data is an I/Q value (In-phase/Quadrature value) indicating a change in amplitude and phase. Also, electro-optical frequency mapping images acquired by applying different test patterns to the semiconductor device S may be provided as a measured image $G_{1B}$ and a reference measured image $G_{3B}$.

Also, as a light source to be used at acquisition of electric signal images or electro-optical frequency mapping images, besides a laser light source, a light source that outputs light of high coherence (coherent light) such as an LED (Light-Emitting Diode) light source may be adopted, or a light source that outputs light of low coherence (incoherent light) such as an SLD (Super Luminescent Diode) light source, an ASE (Amplified Spontaneous Emission) light source, or a lamp light source may be adopted. Alternatively, the laser light source 7C may be a light source that outputs light of a wavelength that causes multiphoton absorption (a wavelength of, for example, 1200 nm or more) and with a short pulse width (for example, a pulse width of subpicoseconds or femtoseconds).

Here, in the image processing method, image processing system, or the storage medium storing image processing program described above, the step of acquiring matching information may be of extracting first shape information from the first pattern image, extracting second shape information from the second pattern image, and acquiring matching information based on the first shape information and the second shape information. This allows easily obtaining matching information even when the first pattern image and the second pattern image are different in contrast.

Also, the step of acquiring matching information may be of adjusting the image size of at least either one of the first pattern image and the second pattern image based on the ratio of a first size of visual field indicating a range on the semiconductor device of the first pattern image to a second size of visual field indicating a range on the reference semiconductor device of the second pattern image. In this case, even when the measured image and the reference measured image are different in size of visual field, a comparative image in which these images are coincident with one another in position on the semiconductor device can be prepared.

Further, the matching information may be at least one of the positional information, rotational information, and magnification information indicating a correlation of the first pattern image and the second pattern image. Use of such matching information allows simply obtaining the positional relationship of the measured image and the reference measured image, and simply acquiring a comparative image based thereon.

Still further, the measured image and the reference measured image may be at least one of the thermal emission image, photo emission image, electrical quantity change image, photoinduced current image, pass/fail information image, phase image, amplitude image, and I/Q image of the semiconductor device.

Also, the comparative image may be an image including an absolute value of a value obtained by subtraction, or may be an image including a value obtained by subtraction. By acquiring such a comparative image, a comparison result of measured images of the semiconductor device and the reference semiconductor device can be made obvious and simply obtained.

Further, the step of acquiring matching information may be of extracting the first shape information and the second shape information based on the contrasts of the measured image and the reference measured image. In this case, more shape information can be acquired from the measured images, and an accurate comparative image can be obtained.

Further, the step of acquiring matching information may be of adjusting the image size of at least either one of the measured image and the reference measured image based on the ratio of a first size of visual field indicating a range on the semiconductor device of the measured image to a second size of visual field indicating a range on the reference semiconductor device of the reference measured image. Thus, even when the measured image and the reference measured image are different in size of visual field, a comparative image in which these images are coincident with one another in position on the semiconductor device can be prepared.

Still further, the matching information may be at least one of the positional information, rotational information, and magnification information indicating a correlation of the measured image and the reference measured image. Use of such matching information allows simply obtaining the positional relationship of the measured image and the reference measured image, and simply acquiring a comparative image based thereon.

Furthermore, the measured image and the reference measured image may be at least one of the thermal emission image, photo emission image, electrical quantity change image, photoinduced current image, pass/fail information image, phase image, amplitude image, and I/Q image of the semiconductor device.

INDUSTRIAL APPLICABILITY

The present invention is used for application of an image processing method, image processing apparatus, and image processing program, and can accurately generate a comparative image of a plurality of measured images of a semiconductor device(s).

REFERENCE SIGNS LIST

101A ... observation system, 105 ... two-dimensional camera, 107 ... lighting device, 109 ... mirror, 111 ... beam splitter, 113 ... objective lens, 115 ... stage, 117 ... computer, 119 ... tester, 125 ... objective lens switching means, 127 ... storage unit, 129 ... image analysis unit, 131 ... image processing unit, 133 ... control unit, $G_{1B}$ ... measured image, $G_{2B}$ ... first pattern image, $G_{5B}$ ... second pattern image, $G_{3B}$ ... reference measured image, $G_{5B}$ ... comparative image, $P_{4B}$ ... shape information, S, SR ... semiconductor device.

What is claimed is:

1. A method for acquiring a comparative image of a measured image measured from a semiconductor device and a reference measured image measured from a reference semiconductor device, the method comprising:
   acquiring the measured image measured from the semiconductor device and a first pattern image showing a pattern of the semiconductor device corresponding to the measured image;
   acquiring the reference measured image measured from the reference semiconductor device being the semiconductor device or a semiconductor device different from the semiconductor device and a second pattern image showing a pattern of the reference semiconductor device corresponding to the reference measured image;
   acquiring matching information indicating a correlation of the first pattern image and the second pattern image based on the first pattern image and the second pattern image, wherein the matching information is obtained by adjusting an image size of at least either one of the first pattern image and the second pattern image based on a ratio of a first size of visual field indicating a range on the semiconductor device of the first pattern image to a second size of visual field indicating a range on the reference semiconductor device of the second pattern image; and
   determining a difference of the measured image and the reference measured image based on the matching information to acquire the comparative image.

2. The method according to claim 1, wherein
the acquiring matching information step comprises
extracting first shape information from the first pattern image,
extracting second shape information from the second pattern image, and
acquiring matching information based on the first shape information and the second shape information.

3. The method according to claim 1, wherein
the matching information is at least one of positional information, rotational information, and magnification information indicating a correlation of the first pattern image and the second pattern image.

4. The method according to claim 1, wherein
the measured image and the reference measured image are at least one of a thermal emission image, a photo emission image, an electrical quantity change image, an photoinduced current image, a pass/fail information image, a phase image, an amplitude image, and an In-phase/Quadrature image of the semiconductor device.

5. A system for acquiring a comparative image of a measured image measured from a semiconductor device and a reference measured image measured from a reference semiconductor device, the system comprising:
   a storage configured to store the measured image measured from the semiconductor device, a first pattern image showing a pattern of the semiconductor device corresponding to the measured image, the reference measured image measured from the reference semiconductor device being the semiconductor device or a semiconductor device different from the semiconductor device, and a second pattern image showing a pattern of the reference semiconductor device corresponding to the reference measured image;
   an image analyzer configured to acquire matching information indicating a correlation of the first pattern image and the second pattern image based on the first pattern image and the second pattern image, wherein the matching information is obtained by adjusting an image size of at least either one of the first pattern image and the second pattern image based on a ratio of a first size of visual field indicating a range on the semiconductor device of the first pattern image to a second size of visual field indicating a range on the reference semiconductor device of the second pattern image; and
   an image processor configured to determine a difference of the measured image and the reference measured image based on the matching information to acquire a comparative image.

6. The system according to claim 5, wherein
the image analyzer extracts first shape information from the first pattern image, extracts second shape information from the second pattern image, and acquires the matching information based on the first shape information and the second shape information.

7. The system according to claim 5, wherein
the matching information is at least one of positional information, rotational information, and magnification information indicating a correlation of the first pattern image and the second pattern image.

8. The system according to claim 5, wherein
the measured image and the reference measured image are at least one of a thermal emission image, a photo emission image, an electrical quantity change image, an photoinduced current image, a pass/fail information image, a phase image, an amplitude image, and an In-phase/Quadrature image of the semiconductor device.

9. A non-transitory storage medium storing an image processing program for acquiring a comparative image of a measured image measured from a semiconductor device and a reference measured image measured from a reference semiconductor device, the image processing program causing a computer to function as:
   an image analyzer configured to, based on a first pattern image showing a pattern of the semiconductor device, corresponding to the measured image measured from the semiconductor device and a second pattern image showing a pattern of the reference semiconductor device being the semiconductor device or a semiconductor device different from the semiconductor device, corresponding to the reference measured image measured from the reference semiconductor device, acquire matching information indicating a correlation of the first pattern image and the second pattern image, wherein the matching information is obtained by adjusting an image size of at least either one of the first pattern image and the second pattern image based on a ratio of a first size of visual field indicating a range on the semiconductor device of the first pattern image to a second size of visual field indicating a range on the reference semiconductor device of the second pattern image; and an image processor configured to determine a difference of the measured image and the reference measured image based on the matching information to acquire a comparative image.

10. A method for acquiring a comparative image of a measured image measured from a semiconductor device and a reference measured image measured from a reference semiconductor device, the method comprising:

acquiring the measured image measured from the semiconductor device;

acquiring the reference measured image measured from the reference semiconductor device being the semiconductor device or a semiconductor device different from the semiconductor device;

extracting first shape information from the measured image based on contrast of the measured image;

extracting second shape information from the reference measured image;

acquiring matching information indicating a correlation of the measured image and the reference measured image based on the first shape information and the second shape information; and determining a difference of the measured image and the reference measured image based on the matching information to acquire the comparative image.

11. The method according to claim 10, wherein the comparative image is an image including an absolute value of a value obtained by subtraction.

12. The method according to claim 10, wherein the comparative image is an image including a value obtained by subtraction.

13. The method according to claim 10, wherein the acquiring matching information step comprises adjusting an image size of at least either one of the measured image and the reference measured image based on a ratio of a first size of visual field indicating a range on the semiconductor device of the measured image to a second size of visual field indicating a range on the reference semiconductor device of the reference measured image.

14. The method according to claim 10, wherein the matching information is at least one of positional information, rotational information, and magnification information indicating a correlation of the measured image and the reference measured image.

15. The method according to claim 10, wherein the measured image and the reference measured image are at least one of a thermal emission image, a photo emission image, an electrical quantity change image, an photoinduced current image, a pass/fail information image, a phase image, an amplitude image, and an In-phase/Quadrature image of the semiconductor device.

16. A system for acquiring a comparative image of a measured image measured from a semiconductor device and a reference measured image measured from a reference semiconductor device, the system comprising:

a storage configured to store the measured image measured from the semiconductor device and the reference measured image measured from the reference semiconductor device being the semiconductor device or a semiconductor device different from the semiconductor device;

an image analyzer configured to extract first shape information based on contrast of the measured image, extract second shape information from the reference measured image, and acquire matching information indicating a correlation of the measured image and the reference measured image based on the first shape information and the second shape information; and an image processor configured to determine a difference of the measured image and the reference measured image based on the matching information to acquire the comparative image;

wherein the extracting second shape information step comprises extracting the second shape information based on contrast of the reference measured image.

17. The system according to claim 16, wherein the comparative image is an image including an absolute value of a value obtained by subtraction.

18. The system according to claim 16, wherein the comparative image is an image including a value obtained by subtraction.

19. The system according to claim 16, wherein the image analyzer extracts the first shape information based on contrast of the measured image, and extracts the second shape information based on contrast of the reference measured image.

20. The system according to claim 16, wherein the image analyzer adjusts an image size of at least either one of the measured image and the reference measured image based on a ratio of a first size of visual field indicating a range on the semiconductor device of the measured image to a second size of visual field indicating a range on the reference semiconductor device of the reference measured image.

21. The system according to claim 16, wherein the matching information is at least one of positional information, rotational information, and magnification information indicating a correlation of the measured image and the reference measured image.

22. The system according to claim 16, wherein the measured image and the reference measured image are at least one of a thermal emission image, a photo emission image, an electrical quantity change image, an photoinduced current image, a pass/fail information image, a phase image, an amplitude image, and an In-phase/Quadrature image of the semiconductor device.

23. A non-transitory storage medium storing an image processing program for acquiring a comparative image of a measured image measured from a semiconductor device and a reference measured image measured from a reference semiconductor device, the image processing program causing a computer to function as:
an image analyzer configured to extract first shape information from the measured image based on contrast of the measured image measured from the semiconductor device, extract second shape information based on contrast of the reference measured image measured from the reference semiconductor device being the semiconductor device or a semiconductor device different from the semiconductor device, and acquire matching information indicating a correlation of the measured image and the reference measured image based on the first shape information and the second shape information; and
an image processor configured to determine a difference of the measured image and the reference measured image based on the matching information to acquire a comparative image.

24. A method for acquiring a comparative image of a measured image measured from a semiconductor device and a reference measured image measured from a reference semiconductor device, the method comprising:
acquiring the measured image measured from the semiconductor device;
acquiring the reference measured image measured from the reference semiconductor device being the semiconductor device or a semiconductor device different from the semiconductor device;
extracting first shape information from the measured image;
extracting second shape information from the reference measured image based on contrast of the reference measured image;
acquiring matching information indicating a correlation of the measured image and the reference measured image based on the first shape information and the second shape information; and
determining a difference of the measured image and the reference measured image based on the matching information to acquire the comparative image.

25. A system for acquiring a comparative image of a measured image measured from a semiconductor device and a reference measured image measured from a reference semiconductor device, the system comprising:
a storage configured to store the measured image measured from the semiconductor device and the reference measured image measured from the reference semiconductor device being the semiconductor device or a semiconductor device different from the semiconductor device;
an image analyzer configured to extract first shape information from the measured image, extract second shape information based on contrast of the reference measured image, and acquire matching information indicating a correlation of the measured image and the reference measured image based on the first shape information and the second shape information; and
an image processor configured to determine a difference of the measured image and the reference measured image based on the matching information to acquire the comparative image.

26. A non-transitory storage medium storing an image processing program for acquiring a comparative image of a measured image measured from a semiconductor device and a reference measured image measured from a reference semiconductor device, the image processing program causing
a computer to function as:
an image analyzer configured to extract first shape information from the measured image measured from the semiconductor device, extract second shape information based on contrast of the reference measured image measured from the reference semiconductor device being the semiconductor device or a semiconductor device different from the semiconductor device, and acquire matching information indicating a correlation of the measured image and the reference measured image based on the first shape information and the second shape information; and
an image processor configured to determine a difference of the measured image and the reference measured image based on the matching information to acquire a comparative image.

* * * * *